(12) United States Patent
Hosotsubo

(10) Patent No.: US 9,529,798 B2
(45) Date of Patent: Dec. 27, 2016

(54) DOCUMENT MANAGEMENT SYSTEM, SEARCH DESIGNATION METHOD, AND STORAGE MEDIUM

(75) Inventor: Toshihiko Hosotsubo, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/221,129

(22) Filed: Aug. 30, 2011

(65) Prior Publication Data

US 2012/0066257 A1    Mar. 15, 2012

(30) Foreign Application Priority Data

Sep. 9, 2010 (JP) .................................. 2010-201996

(51) Int. Cl.
*G06F 17/30* (2006.01)
(52) U.S. Cl.
CPC ... *G06F 17/30011* (2013.01); *G06F 17/30448* (2013.01); *G06F 17/30569* (2013.01)
(58) Field of Classification Search
CPC ................... G06F 17/30976; G06F 17/30386; G06F 17/30365; G06F 17/30867; G06F 17/30979; G06F 17/30011; G06F 17/30864; G06F 17/30448; G06F 17/30339
USPC ................. 707/706, 736, 759, 772
See application file for complete search history.

(56) References Cited

U.S. PATENT DOCUMENTS

| | | | |
|---|---|---|---|
| 6,715,128 B1 * | 3/2004 | Hirashima | G06F 17/30294 707/999.202 |
| 8,065,315 B2 * | 11/2011 | Rapp et al. | 707/759 |
| 9,189,568 B2 * | 11/2015 | Munro, Jr. | G06F 17/30976 |
| 2006/0025071 A1 * | 2/2006 | Yamazaki | G06F 17/30265 455/3.06 |
| 2007/0100868 A1 * | 5/2007 | Hackmann | G06F 17/3056 |
| 2007/0130176 A1 * | 6/2007 | Kawabe | G06F 17/248 |
| 2007/0150461 A1 | 6/2007 | Weigel | |
| 2008/0263199 A1 * | 10/2008 | Maki | H04L 41/044 709/224 |
| 2009/0055356 A1 * | 2/2009 | Hanyu | 707/3 |
| 2009/0300005 A1 * | 12/2009 | Ishiwata | G06F 17/30448 |
| 2010/0076952 A1 * | 3/2010 | Wang et al. | 707/706 |

(Continued)

FOREIGN PATENT DOCUMENTS

| | | |
|---|---|---|
| CN | 1855978 A | 11/2006 |
| JP | 3-051958 A | 3/1991 |
| JP | 2006-018640A A | 1/2006 |

*Primary Examiner* — Tuan A Pham
*Assistant Examiner* — Merilyn Nguyen
(74) *Attorney, Agent, or Firm* — Canon USA, Inc. IP Division

(57) ABSTRACT

A document management system according to the present invention manages a plurality of documents in which attribute names and attribute values corresponding to the attribute names are set as attributes. The document management system displays the attribute names and the attribute values set for a document selected from the plurality of documents, and selects at least one attribute value from the displayed attribute values. When an instruction to display a search screen is issued, the search screen is displayed, and a search conditional expression of an attribute search is set in the search screen, wherein if the instruction to display the search screen is issued in a state where the at least one attribute value is selected, the search screen is displayed in which the selected at least one attribute value is set for the search conditional expression.

11 Claims, 14 Drawing Sheets

(56) References Cited

U.S. PATENT DOCUMENTS

| | | | |
|---|---|---|---|
| 2010/0076975 A1* | 3/2010 | Futatsugi | 707/736 |
| 2010/0088307 A1* | 4/2010 | Watanabe | 707/706 |
| 2010/0191760 A1* | 7/2010 | Kusumura | G06F 17/30569 707/760 |
| 2010/0274802 A1* | 10/2010 | Abe | G06F 17/30277 707/769 |

* cited by examiner

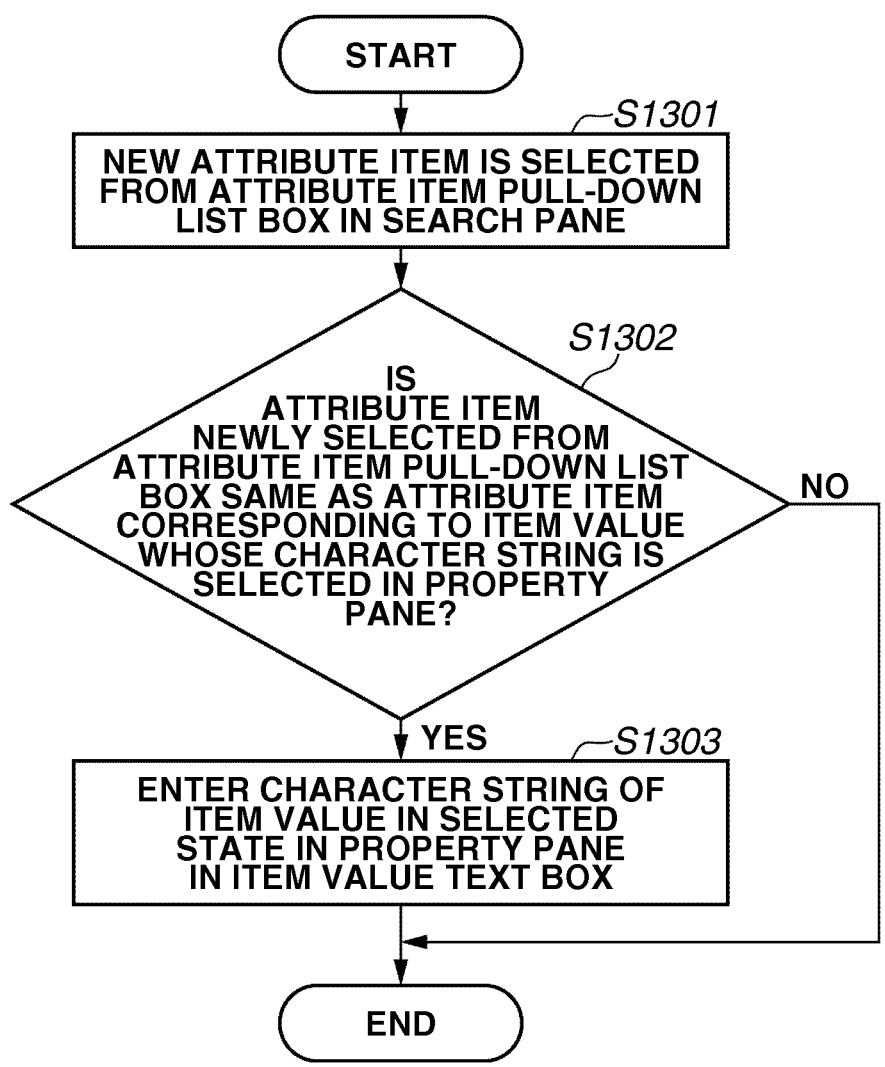

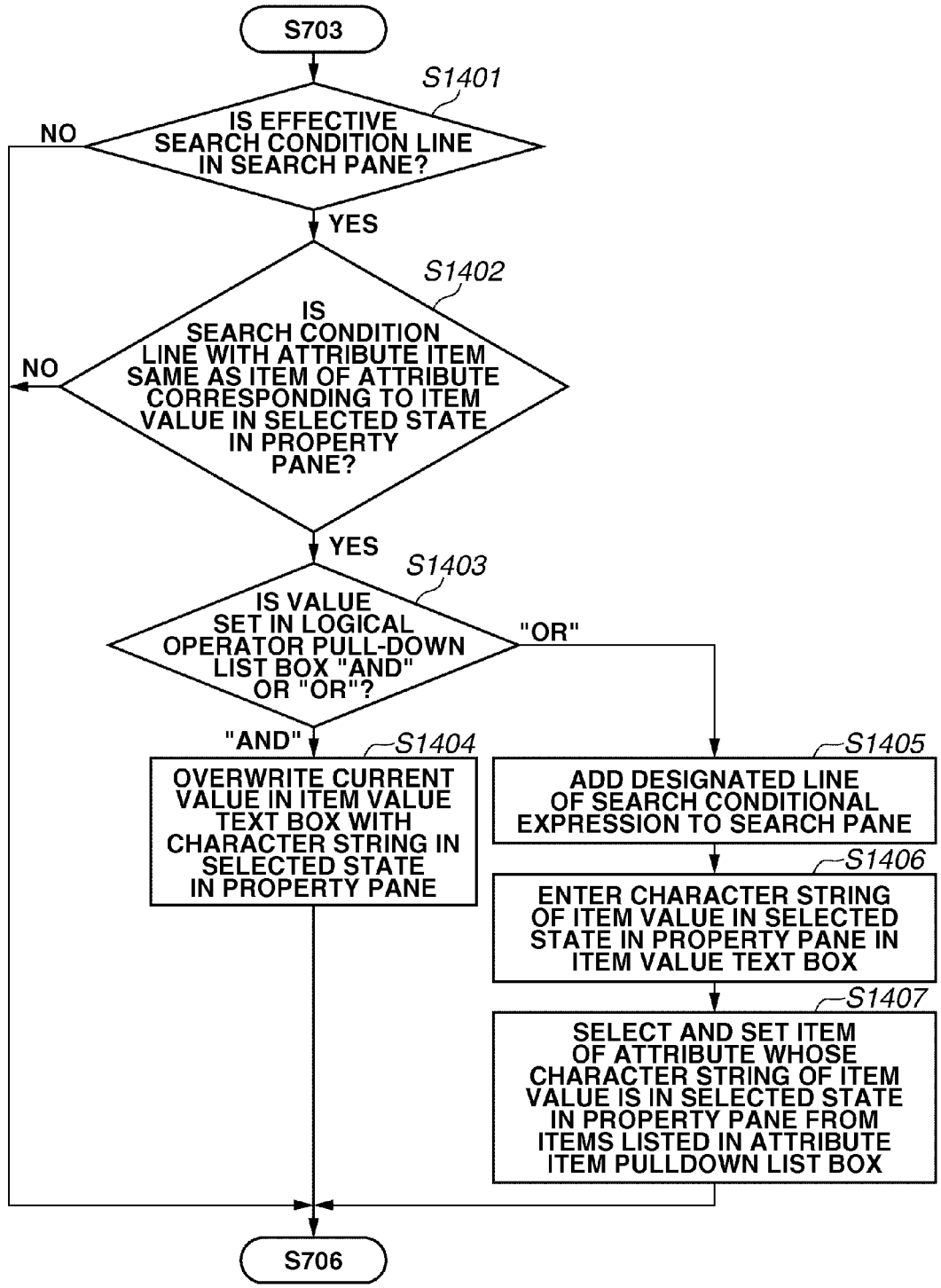

DOCUMENT MANAGEMENT SYSTEM, SEARCH DESIGNATION METHOD, AND STORAGE MEDIUM

BACKGROUND OF THE INVENTION

Field of the Invention

The present invention relates to a document management system which is capable of a search based on document attributes referred to as an attribute search, a search designation method, and a computer-readable storage medium.

Description of the Related Art

Conventionally, as search methods for searching a document group managed by a document management system, there are two known methods referred to as a full-text search and an attribute search. A search target of the full-text search is mainly contents of a text in a document managed by the document management system. One or more character strings included in the text of the document are designated as search keywords when the search is performed. According to the full-text search, if one or more character strings designated as the search keywords are included in the text of the document, that document is retrieved. This means that one or more documents that match a search condition are retrieved according to the execution of the search.

The attribute search defines metadata in the document management system in advance, and searches a value corresponding to one or more pieces of metadata set for each document. The metadata is generally referred to as a property, an index, or an attribute. In the present invention, the metadata is referred to as an attribute and a value of the metadata is referred to as an attribute value.

The attributes to be set to a document may include, for example, a document name, a date and time of creation, a file size, a creator, and a comment. Further, an attribute value is set for each attribute. The attribute values are, for example, "company A estimate.doc", "2009/12/10", "2456", "Momotaro Miyamoto", and "important!". There are two types of attribute values. One is a value which is automatically assigned by the document management system. The other is assigned by a user of the document management system. For example, the attribute such as the document name, the date and time of creation, the file size, or the creator is set when the document is stored in the document management system, whereas the attribute such as the comment is arbitrarily set by the user for the document stored in the document management system.

Regardless of which type the attribute is, the document management system provides a property screen. The property screen can be used to refer the attributes set to the document and to change settings of the document attributes, and enables the user to access the attributes via the property screen. Further, the document management system provides a search screen for the attribute search. The user can perform the search by designating one or more search conditional expressions on the search screen.

A parameter designated for the search conditional expression is a pair of an attribute name and an attribute value of the attribute. The attribute names are, for example, "document name", "date and time of creation", "file size", "creator", and "comment". Additionally, matching conditions, such as partial match, perfect match, and prefix match, are generally used as parameters of the search. In many cases, a search conditional expression used in the attribute search includes three parameters, i.e., an attribute name, a matching condition, and an attribute value.

Further, when a plurality of search conditional expressions are designated for the search, in many cases, the user designates a logical operator by which the conditional expressions are connected into one search conditional expression on the search screen. The logical operators which are usually used are the AND operator and the OR operator. The AND operator is used for searching for a document that matches all the conditional expressions in the connected search conditional expression. The OR operator is used for searching for a document that matches any one of the conditional expressions in the connected search conditional expression. Regarding the attribute search, these parameters can be combined to form a search formula which is more sophisticated. By narrowing down the target document by the search conditions, the user can retrieve the target document more easily from a great number of documents.

In designating the search formula of the attribute search, the user selects one parameter of the attribute name of the search conditional expression from a list provided by the document management system displayed on the search screen. Then, the user enters an attribute value of the selected attribute as a free keyword. Thus, if the input character string of the attribute value is long, the possibility of input error is increased. If an input error occurs, an incorrect search formula will be unintentionally formed by the user. Thus, even if the search is executed, the target document may not be retrieved. Thus, there is a need for means that can help the user to input the character string of the attribute value of the search formula. Japanese Patent Application Laid-Open No. 03-051958 discusses such means.

According to Japanese Patent Application Laid-Open No. 03-051958, if a user performs a search after designating a character string displayed on a display unit, the search will be executed by using the designated character string as the search target. Thus, if a keyword to be searched is included in the character string displayed on the display unit, the user needs to do is to select the keyword by a mouse or the like to execute the search. Thus the user does not need to newly input the character string using an input device such as a keyboard.

However, if the technique discussed in Japanese Patent Application Laid-Open No. 03-051958 is applied to the attribute search, although it is helpful in reducing the possibility of an error regarding the input of a character string of an attribute value, since the user needs to select the attribute name that corresponds to the attribute value, not all of the user's work is reduced.

SUMMARY OF THE INVENTION

The present invention relates to a document management system which is capable of reducing a load related to input of a search condition when a user performs an attribute search and capable of reducing a character string input error.

According to an aspect of the present invention, a document management system capable of managing a plurality of documents in which attribute names and attribute values corresponding to the attribute names are set as attributes includes: an attribute display unit configured to display the attribute names and the attribute values set for a document selected from the plurality of documents, a selection unit configured to select at least one attribute value from the attribute values displayed by the attribute display unit, a search screen display unit configured to, when an instruction to display a search screen is issued, display the search screen, and a setting unit configured to set a search conditional expression of an attribute search in the search screen, wherein if the instruction to display the search screen is issued in a state where the at least one attribute value is selected by the selection unit, the search screen display unit displays the search screen in which the at least one attribute value selected by the selection unit is set for the search conditional expression by the setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 is a flowchart illustrating an operation when setting of an attribute item is changed in a search pane in a state where a character string of an item value is selected in a property pane.

FIG. 14 is a flowchart illustrating an operation for displaying a search pane where an effective search conditional expression is already in the search pane and where a character string of an item value is in a selected state in a property pane.

DESCRIPTION OF THE EMBODIMENTS

Various exemplary embodiments, features, and aspects of the invention will be described in detail below with reference to the drawings.

Figure 1:
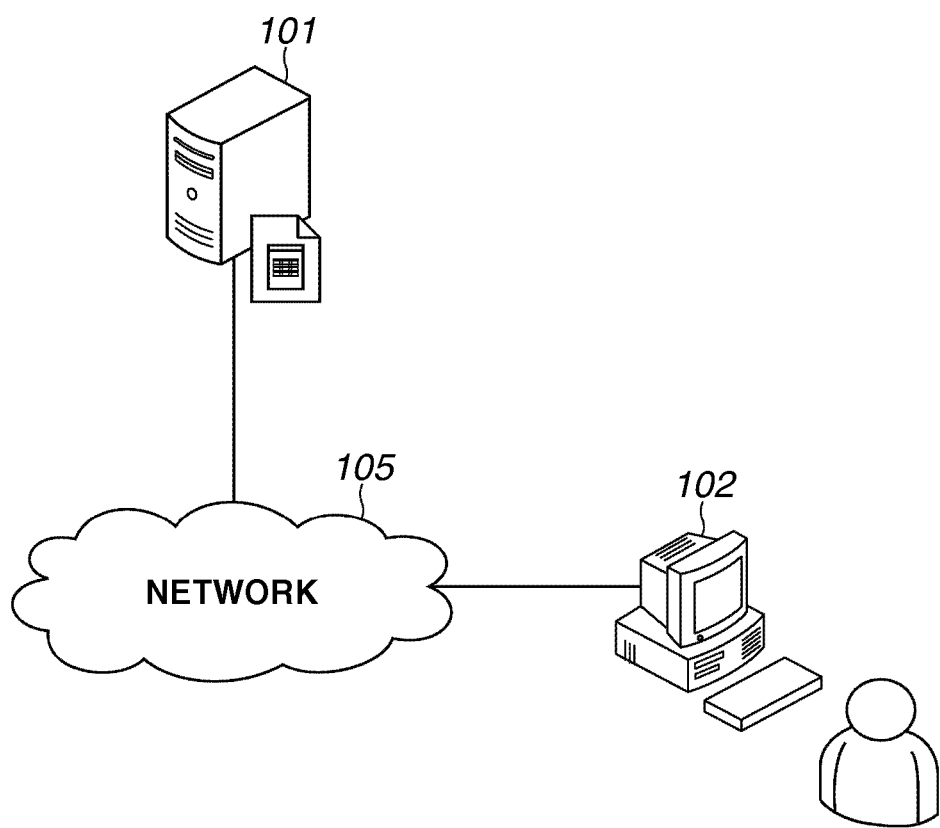
FIG. 1 is a diagrammatic illustration of a system configuration.

FIG. 1 is a diagrammatic illustration of a system configuration according to an exemplary embodiment of the present invention. In FIG. 1, a network 105 is, for example, the Internet or an intranet. Network apparatuses such as a document management server 101 and a client personal computer (PC) 102 are connected to the network 105. The document management server 101 provides a common document management service such as document storage and search. The client PC 102 is a client computer. Although not illustrated, a plurality of client PCs can be connected to the network 105.

A document management client that uses the document management service provided by the document management server runs on the client PC 102. The document management client is an application that runs on various operating systems including Microsoft Windows (registered trademark) and Linux, but also runs on a web browser.

If the network 105 is the Internet, the document management server 101 can be a server that provides a cloud service. In that case, it is necessary to add a proxy server and a web server to the system configuration. Since the configuration of the present exemplary embodiment is a general cloud service configuration, details of the configuration are not described.

Figure 2:
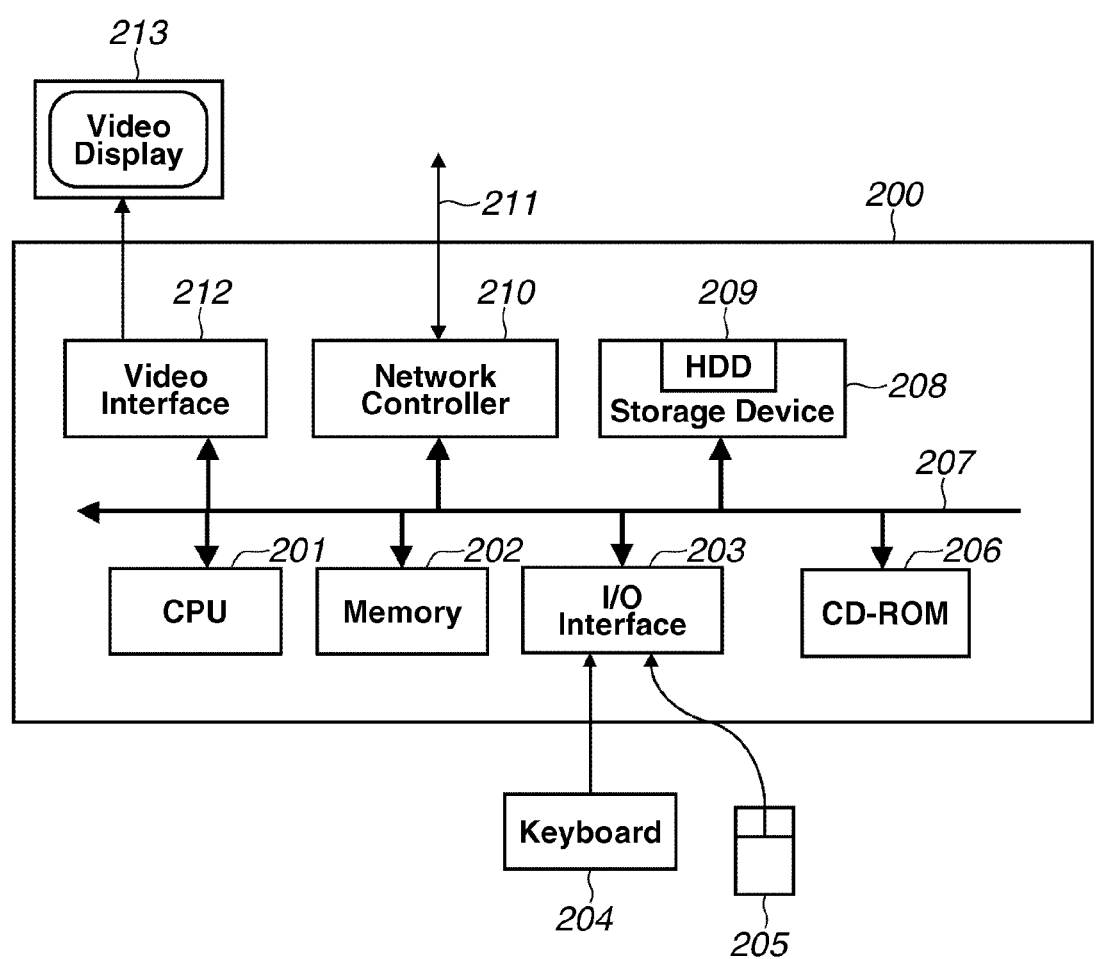
FIG. 2 is a block diagram illustrating a configuration of a typical general-purpose computer module.

FIG. 2 is a block diagram illustrating a configuration of a typical general-purpose computer module 200 according to the present exemplary embodiment of the present invention. The document management server 101 and the client PC 102 are the typical general-purpose computer modules.

An input apparatus such as a pointing device, such as a keyboard 204 or a mouse 205, and an output apparatus such as a display device 213 are connected to the general-purpose computer module 200. A network controller (NC) 210 is connected to the network 105 via a predetermined network interface 211. The NC 210 executes control processing regarding communication with other network apparatuses. A central processing unit (CPU) 201 includes at least one processor. A memory 202 is a random access memory (RAM) or a read-only memory (ROM). A video interface 212 outputs an image to the display device 213.

An input/output (I/O) interface 203 receives input from the keyboard 204 or the mouse 205. A storage device 208 typically includes a hard disk drive (HDD) 209. The storage device 208 can also include a silicon drive (not illustrated). A compact disc read only memory (CD-ROM) drive 206 is used as a non-volatile data source. An interconnecting bus 207 interfaces communication between blocks by control of the CPU 201 in accordance with an operating system such as Microsoft Windows (registered trademark) or Linux that runs on the general-purpose computer module 200.

Various control programs of the document management server 101 and the client PC 102 of the exemplary embodiments illustrated in the flowcharts described below are stored in either the memory 202 or the storage device 208 of the corresponding apparatus, and executed by the CPU 201 of the respective apparatuses. The document management server 101 includes a database for document management. The database is also included in the storage device 208.

Figure 3:
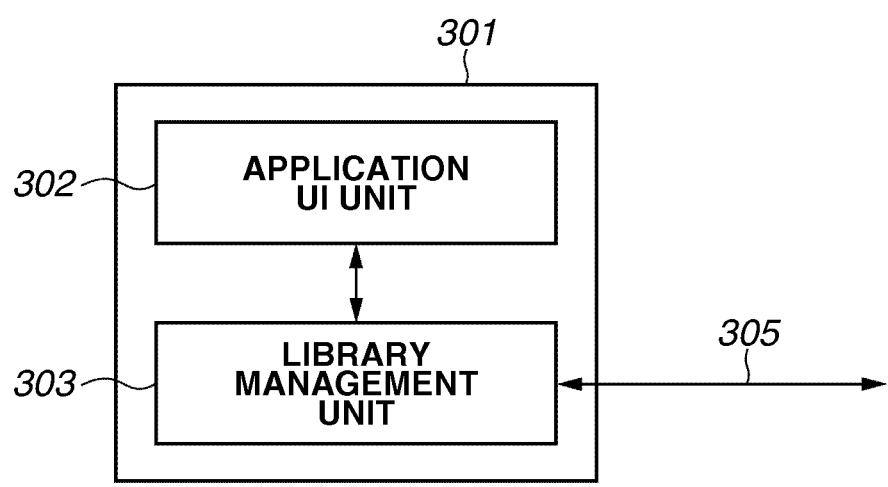
FIG. 3 is a block diagram illustrating a software configuration of an application of a document management client.

FIG. 3 is a block diagram illustrating a software configuration of an application of a document management client. An application 301 includes a user interface (UI) used for executing various functions. If a user inputs a request via a screen of the display device 213 using the keyboard 204 or the mouse 205, the application 301 receives the request and executes processing of the corresponding function.

An application UI unit (hereinafter referred to as a UI unit) 302 and a library management unit 303 are components that comprise the application. The UI unit 302 forms the user interface illustrated in FIG. 4 and also displays acceptance of various input operations performed by the user and results of processing which has been performed according to the input operations. Thus, the UI unit 302 functions as various units such as an attribute display unit, a selection unit, a search screen display unit, and a setting unit. The attribute display unit displays an attribute name set for each document and an attribute value thereof. The selection unit allows the user to select a desired attribute value from the displayed attribute values when the user issues an instruction. The search screen display unit displays a search screen when the user issues an instruction to display the search screen. The setting unit sets a search conditional expression on the search screen.

The library management unit 303 manages a library used by the application 301 and executes various document operations, for example, storing documents in the library, browsing, updating and changing attributes, and searching for a document in the library. The library in this context is a storage unit used for document management. Document data and document management data, such as a document attribute, are stored in the library. There are two types of libraries used by the application 301. These libraries are in different data storage locations.

The first library is a local library, whose data storage area is in the hard disk 209 of the client PC 102, managed by the application 301 itself. In this configuration, the local library does not need the document management server 101.

The second library is a shared library which delegates document management to the document management service provided by the document management server 101. In this configuration, when the library management unit 303 receives a document operation request from the UI unit 302, it transmits the request to the document management server 101. Then, when a result of the request is transmitted from the document management server, the library management unit 303 transmits the result to the UI unit 302. According to the shared library, the configuration of the library management unit 303 can be simple as it only transmits/receives data to/from the document management service of the document management server 101. Thus, the shared library is appropriate if the document management client operates on the web browser.

An interface 305 connects the library management unit 303 to the local library constructed in the storage device 208 or to the document management server provided by the shared library.

Figure 4:
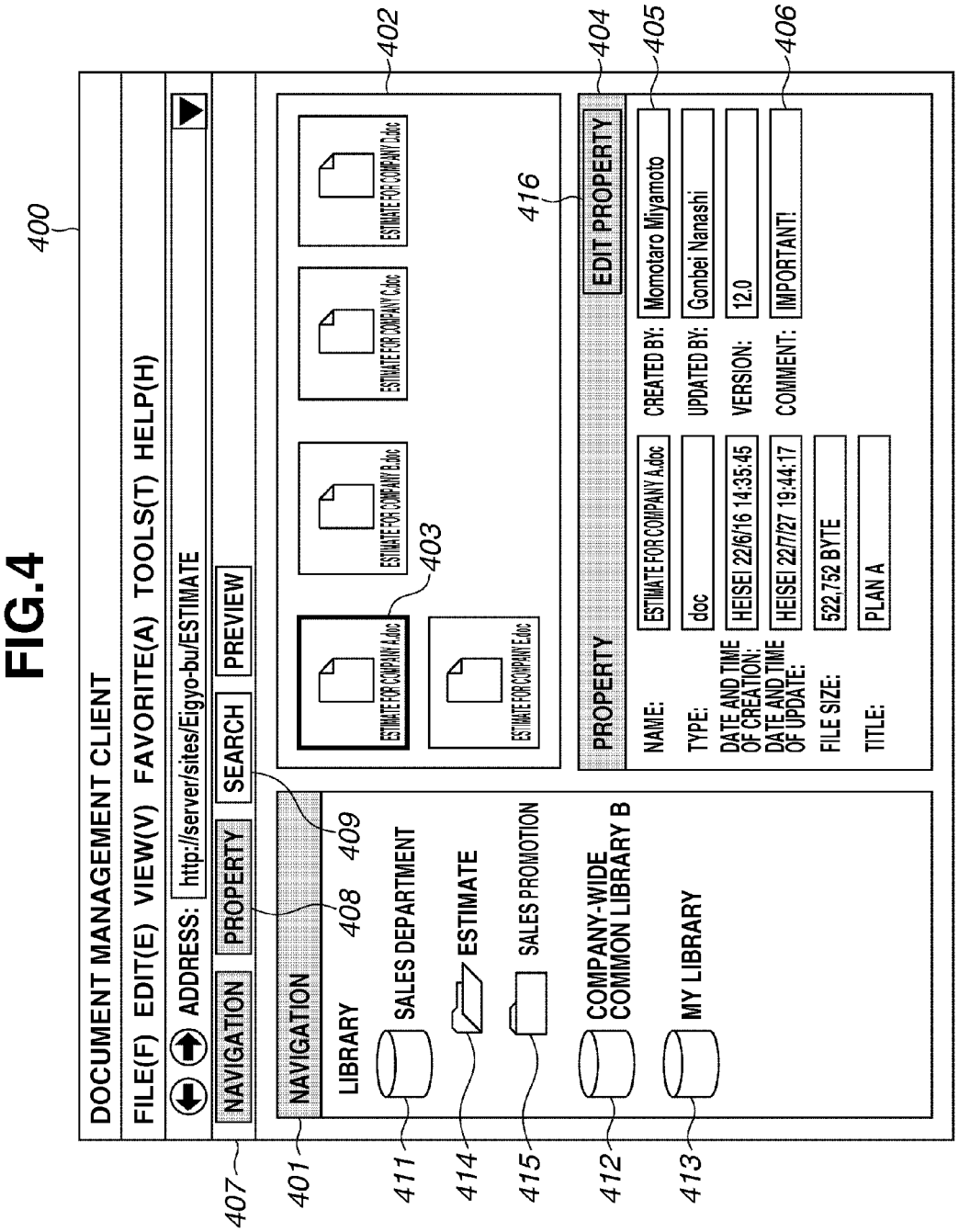
FIG. 4 illustrates an example of a user interface of an application.

FIG. 4 illustrates an example of a user interface of the application.

A main window 400 includes a navigation pane 401. In the navigation pane 401, an icon of a library registered by the application and an icon of a folder arranged below the library are displayed. By pressing the icon of the library or the icon of the folder arranged below the library in the navigation pane, the user can move the current location to the library/folder. In FIG. 4, libraries 411 to 413 and folders 414 and 415 are displayed. The folder 414 is the currently-selected folder.

A file list pane 402 (document list screen) is configured to display one or a plurality of documents or folders stored in the location selected in the navigation pane. In FIG. 4, five documents are listed in the pane 402 and one document is framed by a selection frame 403. The selection frame 403 indicates that the framed document is the document selected from among the plurality of documents by the user's instruction. The file list pane 402 has a function of displaying a search result when the user presses a search button 512 described below and a search is executed, in place of the display of documents or folders stored in the selected location in the navigation pane. The search result is a list of documents or folders that match the search condition.

A property pane 404 (attribute display screen) is configured to display an attribute of a document selected in the file list pane 402. The attribute is a setting value that includes an item (e.g., name, date, size, and so on) and a value of the item (e.g., May 10, 500 bytes, and so on). In FIG. 4, a value "Momotaro Miyamoto" is set in an item field 405 for an item "creator". Further, a value "important!" is set in an item field 406 for an item "comment". The item that can be set in each field is defined for each library and is changeable according to the function of the library.

For example, if the library is the local library, items same as the attributes which can be set by the file system of the operating system can be set. Further, if the library is the shared library, items same as the attributes arbitrarily customized by the document management server 101 can be set. The library management unit 303 described above is capable of managing the attribute items as the feature of the library, acquiring information about the attribute items and attribute item values according to the library, and transmitting the acquired information to the UI unit 302.

According to the present exemplary embodiment, the attribute item denotes the attribute name and the attribute item value denotes the attribute value.

A button 416 can change the item value of the attribute displayed in the property pane (attribute display screen) to an editable state. Unless the button is pressed and the state is changed to the editable state, the item value of the attribute cannot be changed in the property pane. A panel 407 is used for changing display/non-display of the pane. The panel 407 includes buttons 408 and 409. The button 408 is used for changing display/non-display of the property pane 404. The button 409 is used for changing display/non-display of a search pane (search screen) described below.

The property pane 404 and a search pane 501 are mutually exclusive in the main window 400 and are not displayed at the same time. Thus, if the button 408 that changes the display/non-display of the property pane 404 is selected, the button 409 that changes the display/non-display of the search pane cannot be selected and vice versa.

According to such configuration, since the property pane 404 is displayed only when the user performs the document operation, and the search pane (search screen) is displayed only when the user performs the search, a wide display area can be obtained. However, the present invention is not limited to such a configuration. For example, the user interface can be configured such that the property pane and the search pane are displayed at the same time. Then, the user can perform settings of the search pane while referring to the display in the property pane.

Figure 5:
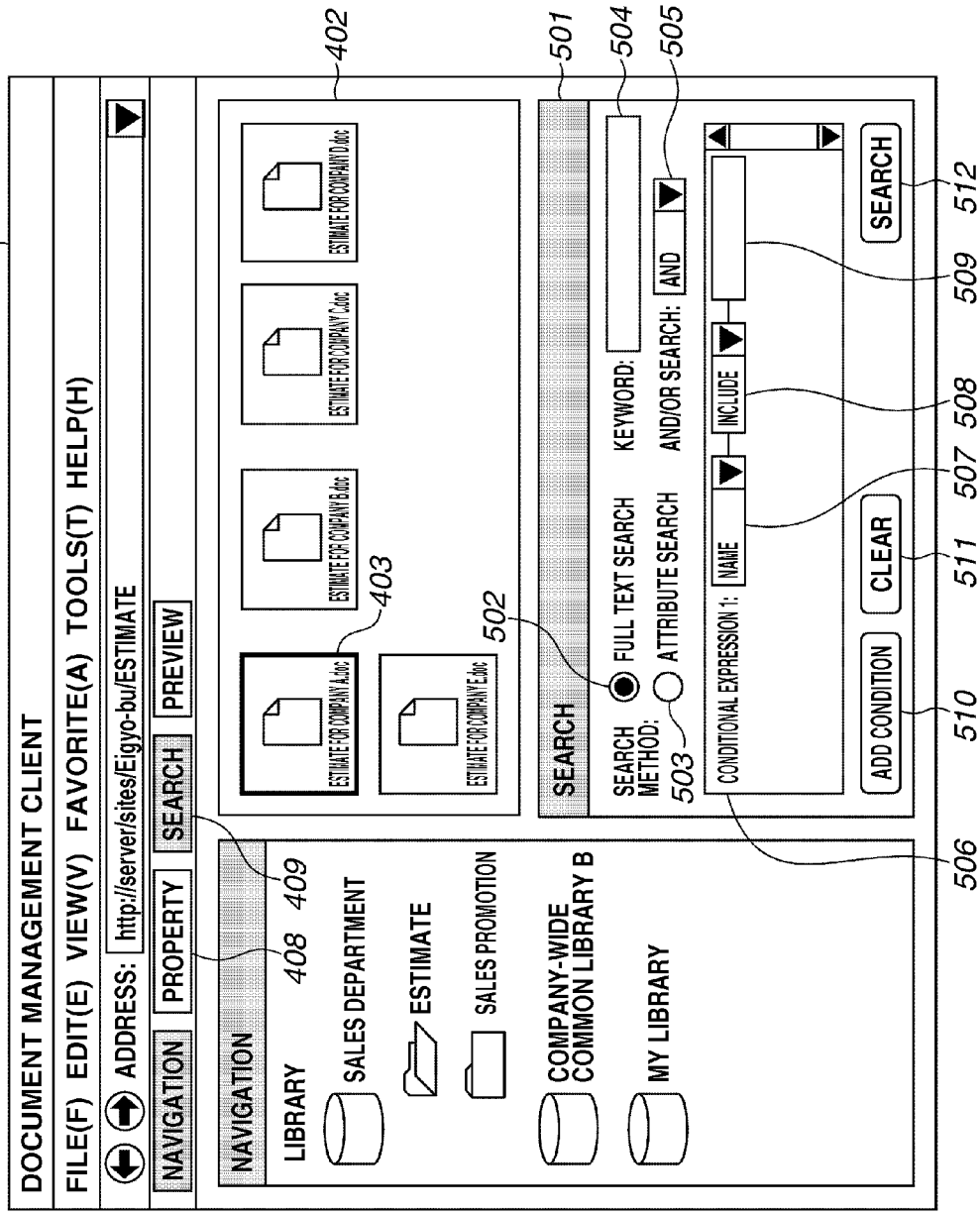
FIG. 5 illustrates an example of a user interface when a button used for changing display/non-display of a search pane in a main window of an application is pressed.

FIG. 5 illustrates an example of the user interface which is displayed when the button 409 used for changing display/non-display of the search pane in the main window 400 is pressed. The search pane 501 is used when the user performs the document search. The search pane 501 provides two functions, i.e., full-text search and attribute search.

The user selects a full-text search selection button 502 for the full-text search. The user selects an attribute search selection button 503 for the attribute search. The full-text search selection button 502 and the attribute search selection button 503 are mutually exclusive and both of them cannot be selected at the same time. The default button is the full-text search selection button 502. Thus, when the search pane 501 is displayed according to the user's pressing of the button 409, which changes display/non-display of the search pane, the full-text search selection button 502 is usually selected in the search pane 501.

A search keyword text box 504 is used to enter a search keyword used for the full-text search. If the full-text search selection button 502 is selected, the user can enter a search keyword in the search keyword text box 504. A pull-down list box 505 is used for designating a logical operator (AND operator or OR operator) for combining the search conditional expressions when the user designates two or more search conditional expressions. The pull-down list box contains two values "AND" and "OR", and one operator can be selected at a time. The default operator is the "AND" operator.

A field 506 is where the search conditional expressions are listed. If the search conditional expressions are added by the pressing of an add button 510 described below, and the added search conditional expressions do not fit in the field 506, a scroll bar will be activated to display the search conditional expressions beyond the display field to receive an input thereto.

An attribute item pull-down list box 507 designates an attribute item of conditional expression 1 which is a first search conditional expression. The attribute item pull-down list box 507 includes attribute items defined by the library where the document currently selected in the file list pane 402 is stored. One of the attribute items can be selected from the pull-down list box. The default attribute item is "name". The "name" is the attribute item corresponding to a document name.

A matching condition designation pull-down list box 508 is used for designating a matching condition of the conditional expression 1. The matching condition designation pull-down list box 508 includes a list of matching conditions corresponding to the data type of the attribute item selected from the attribute item pull-down list box 507. The user can select one condition from the list. If the attribute item selected from the attribute item pull-down list box 507 is a character string type item such as "name", "creator", or "comment", then a condition such as "include", "equal to", "start from", and "not equal to" will be listed. These conditions are matching condition corresponding to partial match, perfect match, prefix match, and complete unmatched, respectively.

The default value of the matching condition designation pull-down list box 508 is "include", which indicates partial match. If the matching condition is partial match, regarding the attribute item designated by the attribute item pull-down list box 507, if a document which includes any part of the character string entered in an item value text box 509 described below exists, that document will be retrieved.

If the matching condition is perfect match, regarding the attribute item designated by the attribute item pull-down list box 507, if a document includes an item value that perfectly matches the character string entered in the item value text box 509, that document will be retrieved. Although prefix match and complete unmatched are not described, they are matching conditions that are generally used in the attribute search. If the attribute item selected from the attribute item pull-down list box 507 is a date-and-time type such as "date and time of creation" and "date and time of update", then "equal to", "equal to next date or earlier", and "equal to next date or later" will be listed. These are the matching conditions used for matching the item value to the designated date and time, on the designated date and time or earlier, and the designated date and time or later. The default value is "equal to" which indicates a date and time same as the designated date and time.

If the attribute item selected from the attribute item pull-down list box 507 is a numerical type item such as "file size", then "equal to", "equal to next value or greater", and "equal to next value or smaller" will be listed. These are the matching conditions used for matching the item value to the designated value, the designated value or greater, and the designated value or smaller. The default value is "equal to" which indicates a value same as the designated value. The pull-down list boxes 505 to 509 are operable when the attribute search selection button 503 is selected.

The add button 510 is used for adding a designation line of a search conditional expression to the field 506. If the add button 510 is pressed in the display state in FIG. 5, a line for designating conditional expression 2 as a second search conditional expression will be added to the line next to the conditional expression 1. Further, if the add button 510 is pressed again, a line for conditional expression 3 as a third search conditional expression will be added to the line next to the conditional expression 2. In the similar manner, the line for designating the conditional expression is sequentially added to the field 506 when the add button 510 is pressed.

Similar to the conditional expression 1, an attribute item pull-down list box, a matching condition pull-down list box, and an item value text box are provided for each conditional expression. Only the search conditional expression to which input to every box has been completed is considered as an effective search conditional expression when the search is executed.

Actually, since the default value is set for each of the attribute item pull-down list box and the matching condition pull-down list box, if an item value is input in the item value text box, the search conditional expression will be considered as an effective conditional expression. Effective search conditional expressions are combined by the logical operator set in the logical operator pull-down list box 505. Then the search conditional expressions are executed as one search conditional expression.

A clear button 511 is used for returning the input state of the search pane 501 to an initial state. The state illustrated in FIG. 5 is the initial state of the search pane 501. If the clear button 511 is pressed, the search condition lines for the conditional expression 2 or later, which are added to the search pane 501 by the add button 510, are deleted from the search pane 501, and the input state is cleared and the state is returned to the initial state.

The search button 512 is used for executing the search. The search button 512 is selectable only when the search pane 501 is in either of the following states. One state is that the full-text search selection button 502 is selected and one or more characters are input in the search keyword text box 504. The other state is that the attribute search selection button 503 is selected and at least one search conditional expression having an item value input in the item value text box exists. If the search button 512 is pressed, according to the input in the search pane 501, the full-text search or the attribute search is executed, and a result of the search will be displayed in the file list pane 402.

Next, an operation of the present invention performed by the system configured as described above will be described.

Figure 6:
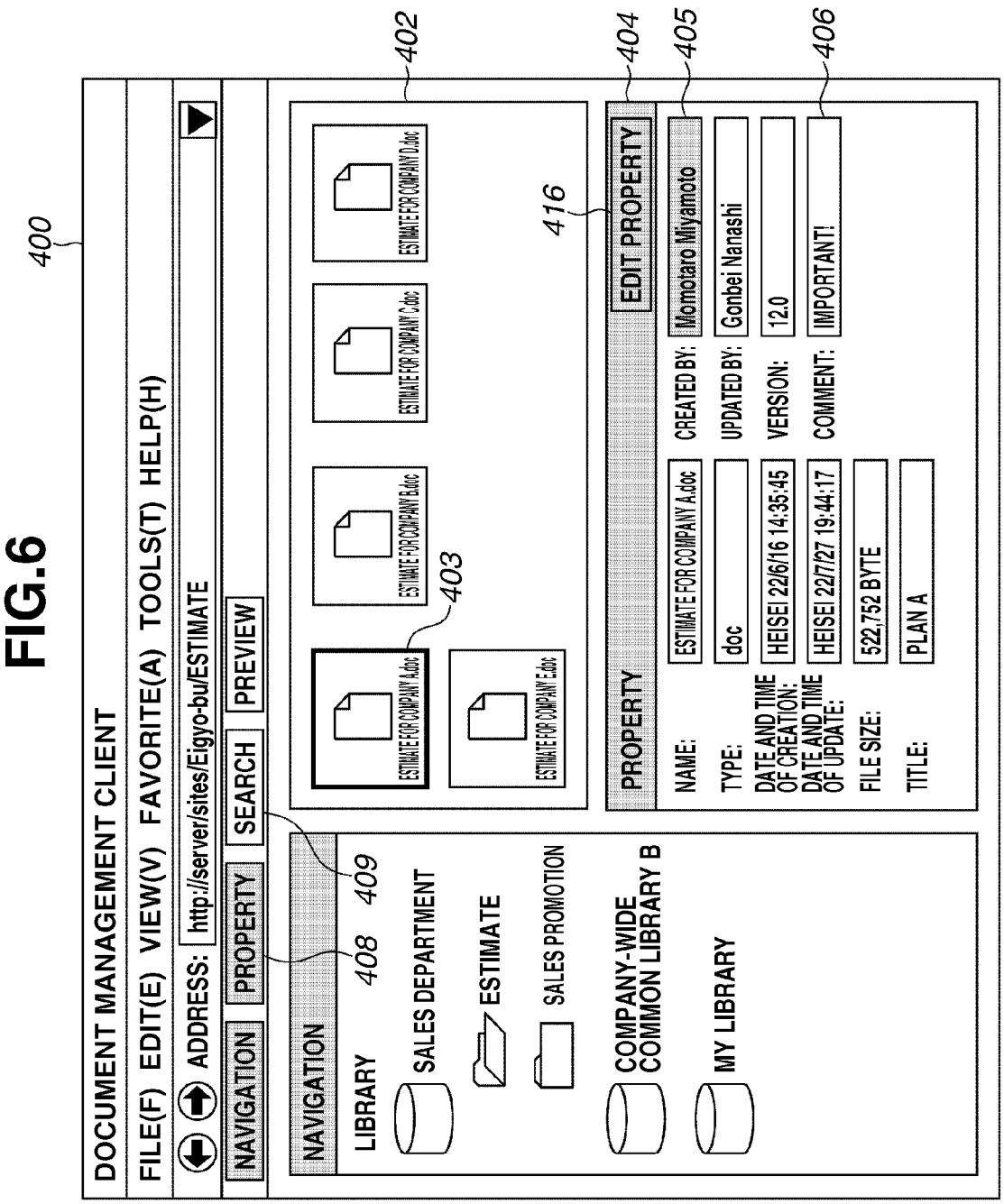
FIG. 6 illustrates an example of a user interface when a character string of an item value of one attribute is selected in a property pane.

As a first exemplary embodiment of the present invention, a display operation regarding the search pane 501 will be described with reference to FIGS. 6 to 8. This operation is performed when an operation for displaying the search pane is executed while a character string of an item value of one attribute is selected in the property pane FIG. 6 illustrates an example of the user interface where each attribute of the document with the selection frame 403, which is selected by the user from the file list pane 402, is displayed in the property pane 404, and further, a character string of an item value of one attribute is selected by the user in the property pane. In FIG. 6, all the characters in the character string of an item value "Momotaro Miyamoto" of the item "creator" in the item field 405 are selected.

For changing characters in a character string of an item value of an attribute into a selected state, the user moves the cursor with the mouse 205 to the start position of the character string of the item value to be selected, clicks the mouse button at the start position, moves the mouse to the end position of the character string to be selected while clicking, and releases the button. Once the characters are selected and the button is released, the selected state of the character string is maintained. The selected state will be maintained until a character string of an item value of a different attribute is selected, an escape button of the keyboard 204 is pressed when the cursor is on the property pane 404, or the display of the property pane 404 is updated by the operation such as a different document is selected in the file list pane 402.

Figure 7:
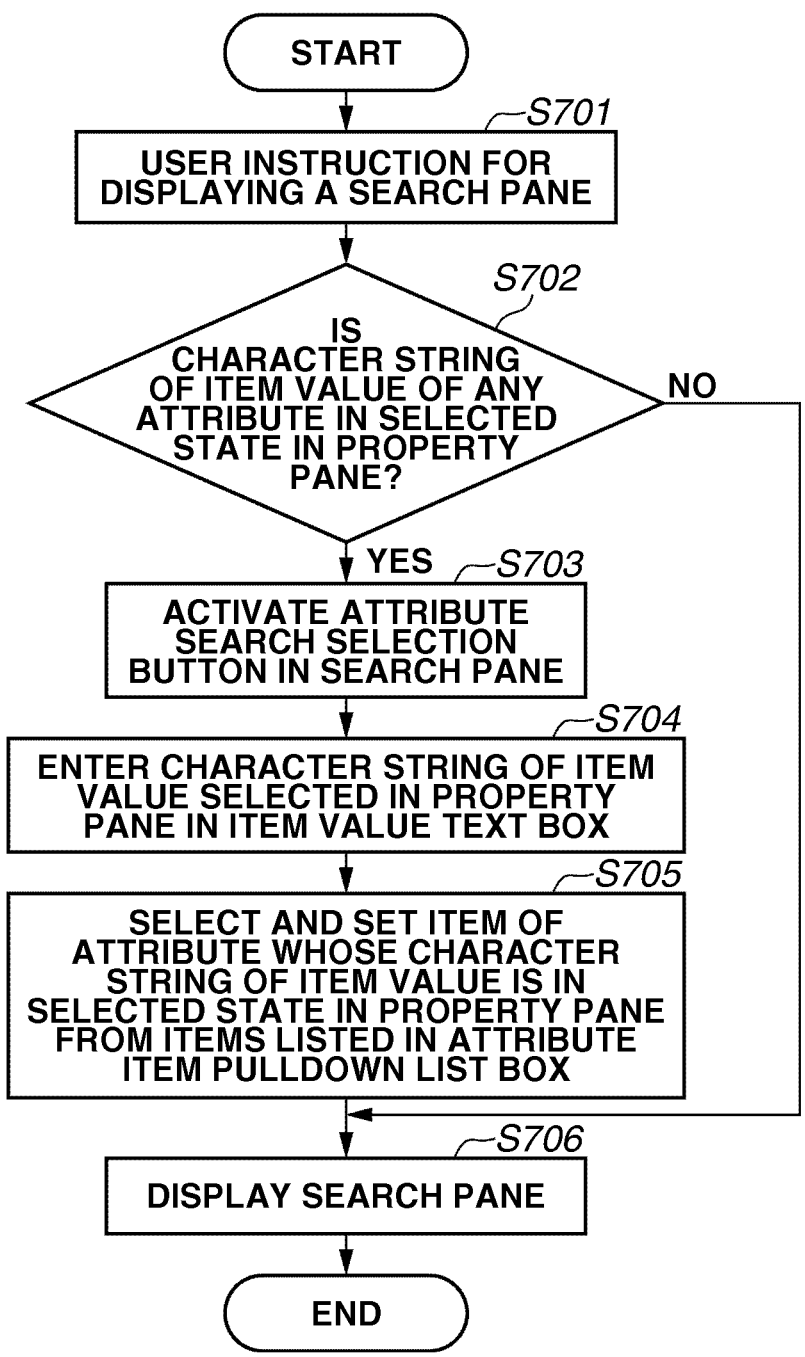
FIG. 7 is a flowchart illustrating an operation for displaying a search pane.

FIG. 7 is a flowchart of the processing performed when the operation for displaying the search pane is performed according to the user's instruction. In step S701, if the user selects the button 409 used for changing the state of the display/non-display of the search pane when the search pane is not displayed, the UI unit 302 starts to execute a process for displaying the search pane 501. In step S702, the UI unit 302, which is driven by the CPU 201 of the client PC 102, determines whether any character string of an item value of an attribute is in the selected state in the property pane 404.

If a character string of an item value of an attribute is in the selected state (YES in step S702), the processing proceeds to step S703. In step S703, the UI unit 302 sets the attribute search selection button 503 in the search pane 501 in the selected state. In step S704, the UI unit 302 enters the character string of the item value which is in the selected state in the property pane 404 in the item value text box 509.

In step S705, the UI unit 302 selects and set an attribute item, which corresponds to the attribute item whose character string of the item value is in the selected state in the property pane 404, from the items listed in the attribute item pull-down list box 507. In step S706, the UI unit 302 displays the search pane 501.

Figure 8:
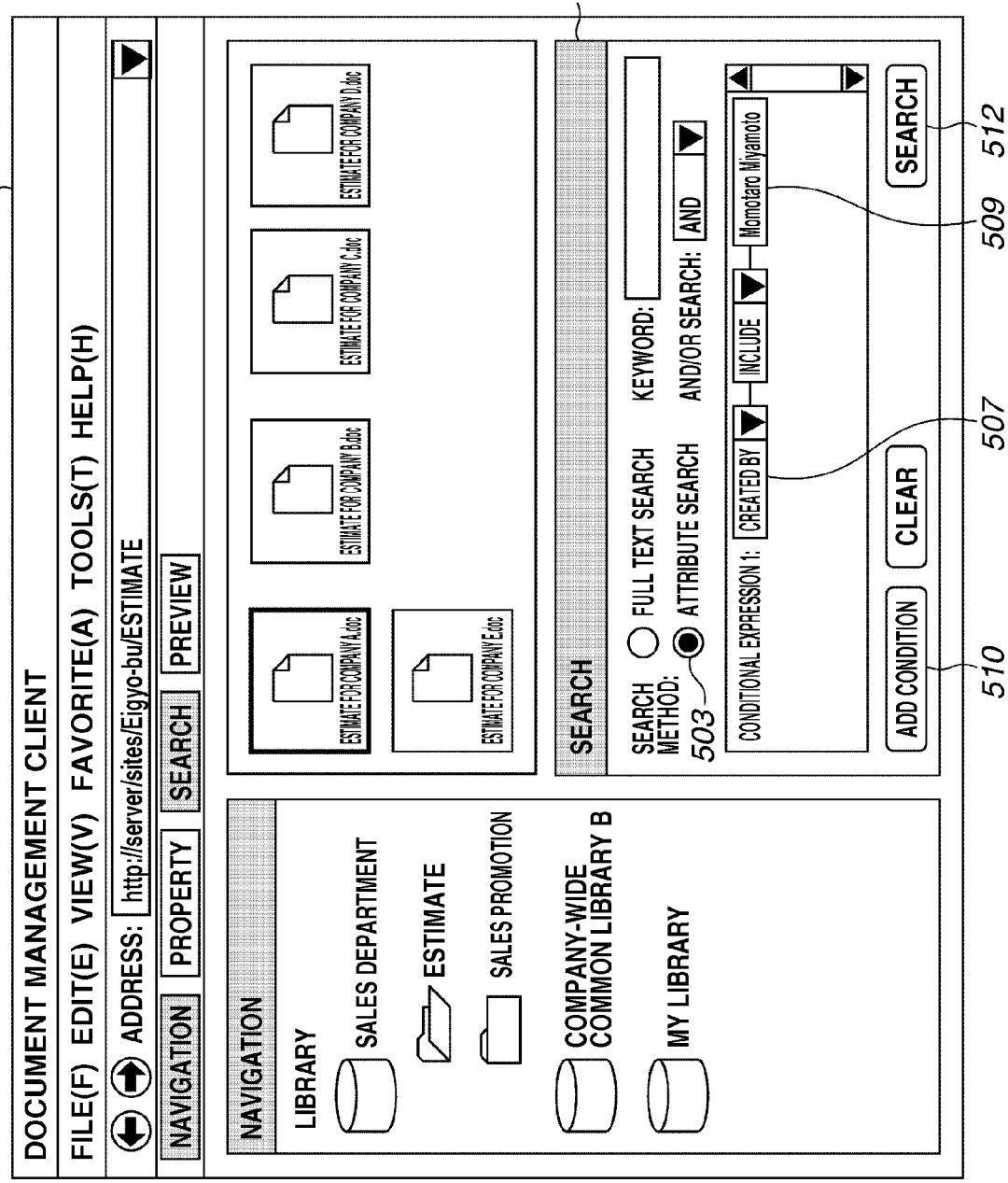
FIG. 8 illustrates an example of a user interface when the operation in the flowchart in FIG. 7 is applied on the user interface in FIG. 6.

FIG. 8 illustrates an example of the user interface when the operation in the flowchart in FIG. 7 is applied to the user interface illustrated in FIG. 6. In the search pane 501, the full-text search selection button 502, which is selected in FIG. 6, is inactivated. In place of the full-text search selection button 502, the attribute search selection button 503 is selected.

"Momotaro Miyamoto", which is the character string of the item value in the selected state in the property pane in FIG. 6, is set in the item value text box 509. Further, the "creator" which is the attribute item of the item value "Momotaro Miyamoto" is set in the attribute item pull-down list box 507.

If the search button 512 is pressed in this setting state, the attribute search will be executed. As a result of the search, a document that includes the character string "Momotaro Miyamoto" in the item value of the attribute item "creator" will be displayed in the file list pane 402. Regarding the search condition set in the search pane illustrated in FIG. 8, search conditions can be further added or the search condition can be corrected before executing the search.

According to the processing described above with reference to FIG. 7, if an operation for displaying the search pane is performed while a character string of an item value of an attribute is selected in the property pane, the character string of the item value selected in the property pane will be set as the item value of the search condition line in the search pane. Additionally, an item corresponding to the item value selected in the property pane is also selected from the items of the search condition line and set.

Thus, possibility of a character string input error due to input of the search condition by the user can be reduced, and further, time and effort for selecting the attribute item can be reduced. Further, since the attribute search is selected as the search method, time and effort necessary in changing the setting from the full-text search to the attribute search can be reduced. In other words, if a character string of an item value of an attribute is selected in the property pane, when the search pane is opened, the search pane is in such a state that the user can immediately perform the attribute search.

According to the first exemplary embodiment, the display operation of the search pane is performed while a character string of an item value of one attribute is selected in the property pane. According to a second exemplary embodiment, the display operation of the search pane is performed while character strings of item values of a plurality of attributes are selected in the property pane. The second exemplary embodiment will be described with reference to FIGS. 9 to 11.

Figure 9:
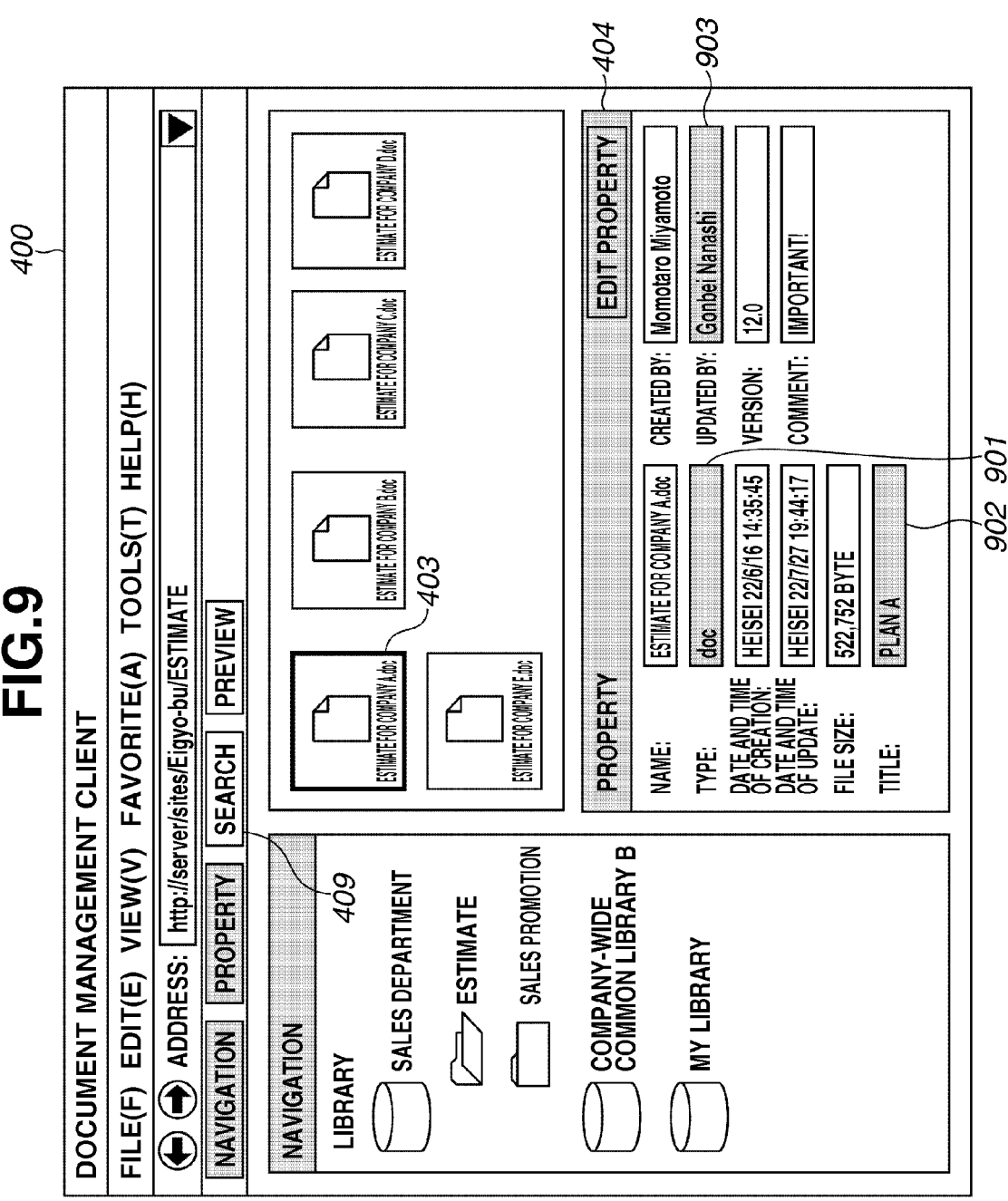
FIG. 9 illustrates an example of a user interface when character strings of item values of a plurality of attributes are selected in a property pane.

FIG. 9 illustrates an example of the user interface when the character strings of the item values of a plurality of attributes are selected in the property pane. In FIG. 9, character strings of an item value "doc" of the attribute "type" in an item field 901, an item value "plan A" of the attribute "title" in an item field 902, and an item value "Gonbei Nanashi" of the attribute "updated by" in an item field 903 are all in the selected state.

In order to change the character strings of item values of the plurality of attributes into the selected state, first, a character string of an item value of a first attribute is changed into the selected state by the mouse using the method described in the first exemplary embodiment. Next, a character string of an item value of a second attribute is changed into the selected state by the mouse using the method described in the first exemplary embodiment while the user pressing the shift key of the keyboard 204. A third and subsequent attributes are set in the selected state by a method similar to the operation method used for the second attribute. The selected state of the plurality of character strings of the item values in the property pane is maintained under a condition similar to the condition, in which a single character string is selected, described in the first exemplary embodiment.

Figure 10:
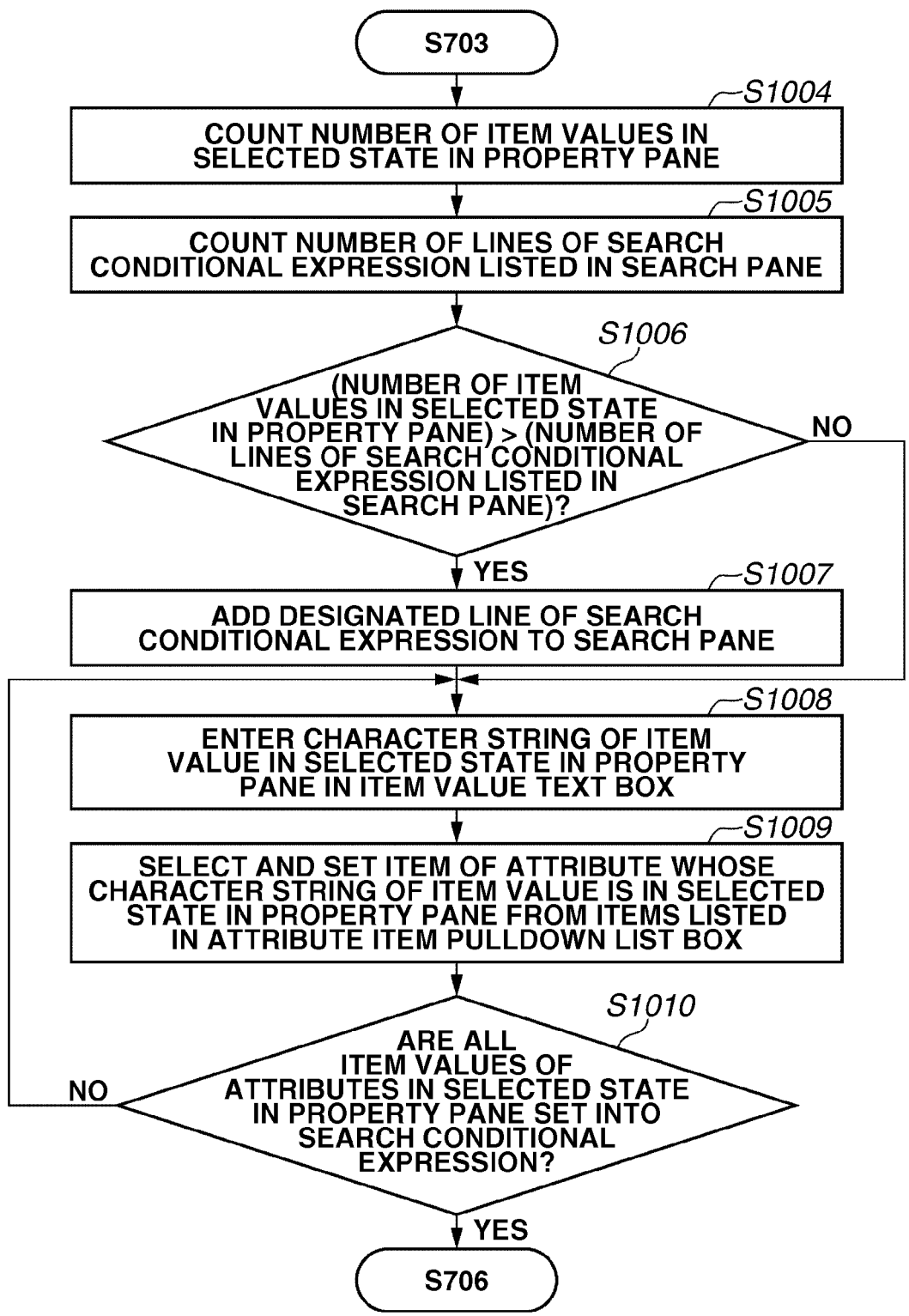
FIG. 10 is a flowchart illustrating an operation for displaying a search pane when character strings of item values of a plurality of attributes are selected in a property pane.

FIG. 10 is a flowchart of the processing which is performed when the operation for displaying the search pane is performed when character strings of a plurality of item values are in the selected state in the property pane. Processing in the flowchart in FIG. 10 is started after the processing in step S703 in FIG. 7.

In step S1004, the UI unit 302 driven by the CPU 201 of the client PC 102 counts the number of item values which are in the selected state in the property pane 404. According to the example in FIG. 9, three item values are in the selected state.

In step S1005, the UI unit 302 counts the number of designation lines of the search conditional expressions listed in the field 506. According to the example in FIG. 5, one designation line is listed in the field 506.

In step S1006, the UI unit 302 determines whether the number of the designation lines of the search conditional expression listed in field 506 is smaller than the number of the item values in the selected state in the property pane 404. If the number of the designation lines of the search conditional expression listed in field 506 is smaller than the number of the item values in the selected state (YES in step S1006), the processing proceeds to step S1007. In step S1007, the UI unit 302 adds a designation line of the search conditional expression to the field 506.

The number of the designation lines of the search conditional expressions added by the UI unit 302 is equal to or greater than the number of the item values in the selected state in the property pane 404. The processing for adding the designation lines of the search conditional expressions in the field 506 by the UI unit 302 is performed according to processing similar to the processing which is performed when the add button 510 used for adding conditions is pressed.

In step S1008, the UI unit 302 enters the character string of a first item value, which is in the selected state in the property pane 404, in the item value text box of the designation line of the first search conditional expression. In step S1009, the UI unit 302 selects and sets the first attribute item whose character string of the item value is in the selected state in the property pane 404 from the items listed in the attribute item pull-down list box of the designation line of the first search conditional expression.

In step S1010, the UI unit 302 repeats the processing performed in steps S1008 and S1009 for each item value in the selected state in the property pane 404. As a result, the character strings of the item values in the selected state in the property pane 404 and the attribute items corresponding to the item values are sequentially set in the lines of the search conditional expressions added to the field 506. Then, the UI unit 302 performs the processing corresponding to step S706 in FIG. 7.

Figure 11:
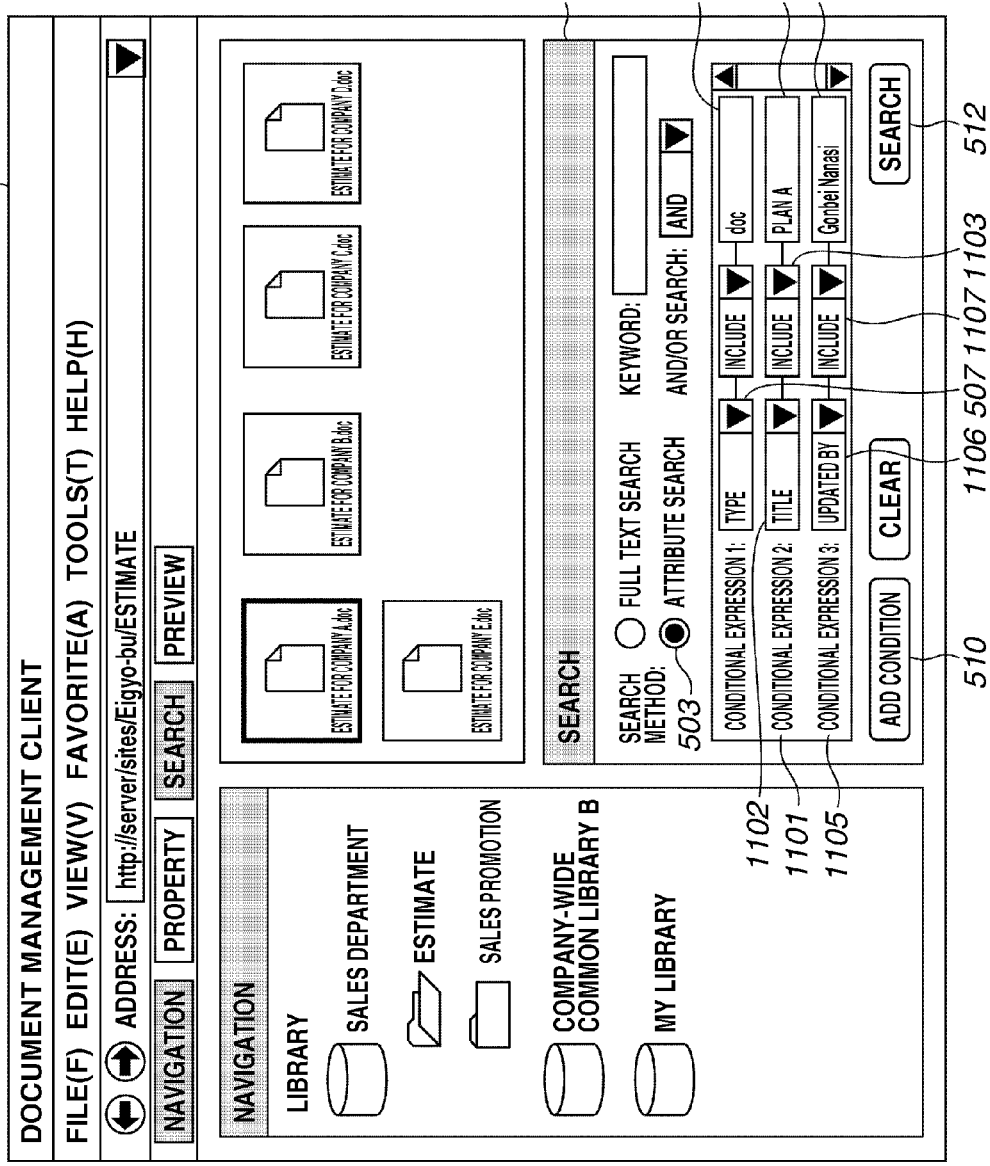
FIG. 11 illustrates an example of a user interface when the operation in the flowchart in FIG. 10 is applied on the user interface in FIG. 9.

FIG. 11 illustrates an example of the user interface when the operation illustrated in the flowchart in FIG. 10 is applied to the user interface illustrated in FIG. 9. In the search pane 501, two designation lines 1101 and 1105 of two search conditional expressions, i.e., the conditional expression 2 and the conditional expression 3, are added to the field 506. Accordingly, a total of three designation lines of three search conditional expressions are in the field 506.

The character string of the item value "doc", which is in the selected state in the property pane in FIG. 9, is set in the item value text box 509 of the conditional expression 1, and the item "type" is set in the attribute item pull-down list box 507 of the conditional expression 1. Further, the character string of the item value "plan A", which is in the selected state in the property pane, is set in an item value text box 1104 of the conditional expression 2, and the item "title" is set in an attribute item pull-down list box 1102 of the conditional expression 2.

Additionally, the character string of the item value "Gonbei Nanashi", which is in the selected state in the property pane, is set in an item value text box 1108 of the conditional expression 3. Further, the item "updated by" is set in an attribute item pull-down list box 1106 of the conditional expression 3.

According to the operation described with reference to FIG. 10, if an operation for displaying the search pane is performed while character strings of a plurality of attribute item values are selected in the property pane, the following processing is performed. More specifically, designation lines of search conditional expressions are added so that all the attribute item values which are selected in the property pane can be designated in the search conditional expressions in the search pane. Thus, time and effort for pressing the add button 510 and adding the designation line of the search conditional expression can be reduced.

According to a third exemplary embodiment, a method for simplifying setting of the matching condition pull-down list box used for designating a matching condition of the conditional expression will be described with reference to FIG. 12.

Figure 12:
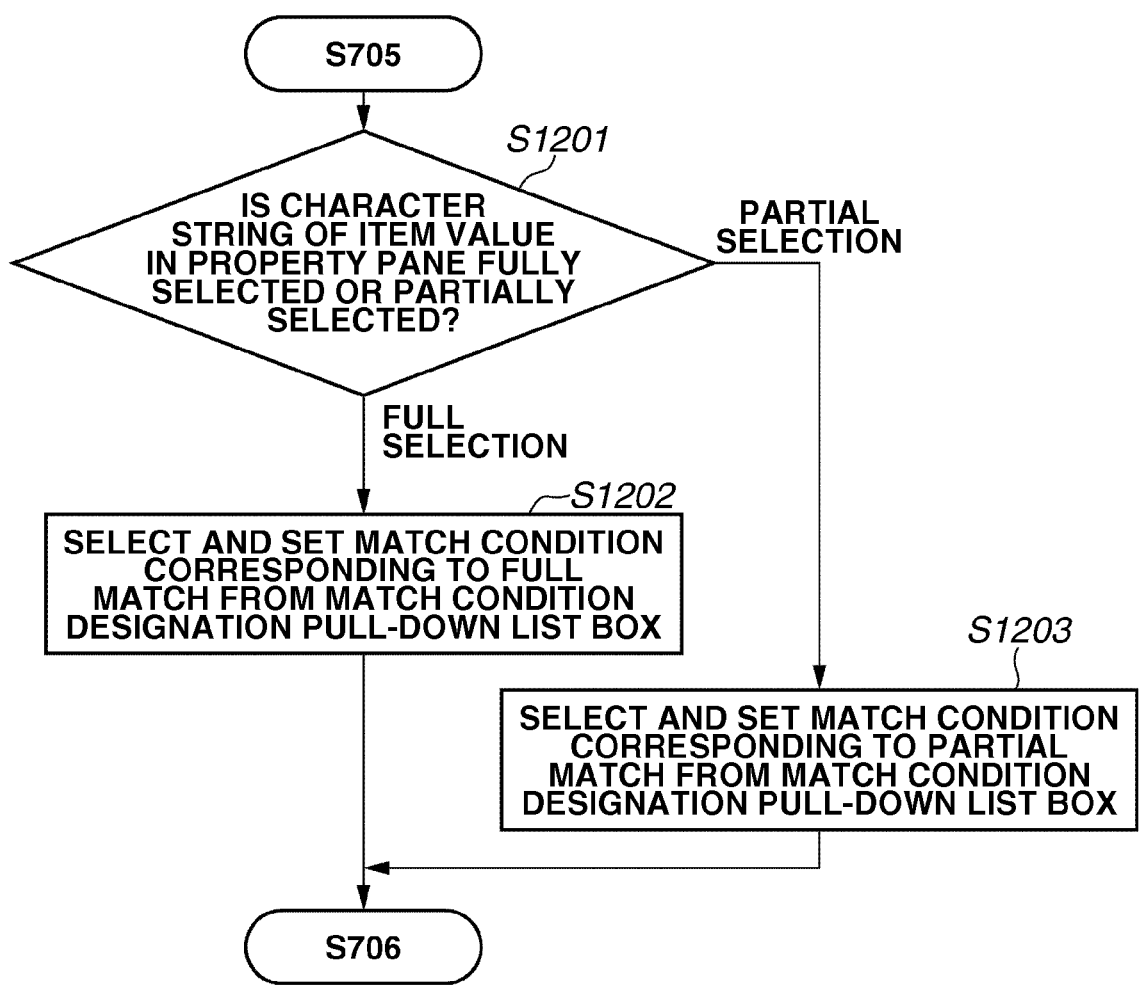
FIG. 12 is a flowchart illustrating an operation for displaying a search pane when a character string of an item value of an attribute is selected in a property pane.

FIG. 12 is a flowchart of the processing performed when the operation for displaying the search pane is performed while a character string of an attribute item value is in the selected state in the property pane. Regarding the selection of the character string of the attribute item value in the property pane, both full selection and partial selection of the character string can be performed. In order to partially select the character string of the attribute item value in the property pane, the user selects not all but a part of the character string of the attribute item value by the mouse as described above according to the first exemplary embodiment. For example, "taro" which is a portion of the character string "Momotaro Miyamoto" of the item value "creator" in the item field 405 in FIG. 6 can be partially selected.

Processing in the flowchart in FIG. 12 is started after the processing in step S705 in FIG. 7. In step S1201, the UI unit 302 driven by the CPU 201 of the client PC 102 determines whether the character string of the item value which is in the selected state in the property pane 404 is fully selected or partially selected.

If the character string of the item value in the selected state in the property pane 404 is fully selected (FULL SELECTION in step S1201), the processing proceeds to step S1202. In step S1202, the UI unit 302 selects and sets a matching condition that corresponds to the perfect match from the list items of the matching condition designation pull-down list box 508. For example, if "Momotaro Miyamoto", which is the item value of "creator" described above, is fully selected, "equal to" will be selected as the matching condition.

On the other hand, if the character string of the item value in the selected state in the property pane 404 is partially selected (PARTIAL SELECTION in step S1201), the processing proceeds to step S1203. In step S1203, the UI unit 302 selects and sets a matching condition that corresponds to partial match from the list items in the matching condition designation pull-down list box 508. For example, if "taro", which is a portion of the item value of "creator" described above, is selected, "include" will be selected as the matching condition. Then, the UI unit 302 performs the processing corresponding to step S706 in FIG. 7.

According to the operation illustrated in FIG. 12, if the whole character string of the attribute item value is selected in the property pane, the matching condition corresponding to perfect match will be selected as the matching condition of the search. On the other hand, in the case of partial match, the matching condition corresponding to partial match will be selected. Thus, time and effort necessary in selecting items for the matching condition can be reduced.

If a value set for an attribute item is a character string type attribute item, since many similar values exist, it is desirable to use perfect match so as not to retrieve irrelevant documents by the search. Thus, when the character string of the attribute item value is used as it is, it is desirable to designate perfect match rather than partial match to perform the search.

On the other hand, if a portion of the character string of the attribute item value is used in the search, it is desirable to use partial match rather than perfect match. This is because there is a possibility of a value, of a different item, including that portion of the character string.

According to the exemplary embodiments described above, the property pane 404 and the search pane 501 are mutually exclusive in the main window 400 and are not displayed at the same time. According to a fourth exemplary embodiment, however, the property pane and the search pane can be displayed at the same time. Thus, the user can perform settings of the search pane while referencing the property pane. A method for simplifying settings of the search condition where the property pane and the search pane are displayed at the same time will be described.

FIG. 13 is a flowchart illustrating the processing performed when the setting of the attribute item is changed in the search pane 501 while a character string of an item value is in the selected state in the property pane 404. In step S1301, when the selection of the attribute item pull-down list box is changed in the search pane, the UI unit 302 driven by the CPU 201 of the client PC 102 performs the following processing.

In step S1302, the UI unit 302 determines whether an attribute item newly selected from the attribute item pull-down list box is same as the attribute item which corresponds to the item value whose character string is selected in the property pane.

If the UI unit 302 determines that the attribute items are the same (YES in step S1302), the processing proceeds to step S1303. In step S1303, the UI unit 302 enters the character string of the item value selected in the property pane in the item value text box, and then the processing ends.

For example, if the item value "Momotaro Miyamoto" which corresponds to "creator" of the item field 405 in the property pane 404 is selected, and if the attribute item selected from the attribute item pull-down list box 507 in the search pane 501 is changed from "name" to "creator", the item value "Momotaro Miyamoto", which is in the selected state, will be input in the item value text box 509 in the search pane 501.

Thus, as in the case of the first exemplary embodiment, possibility of a character string input error when the user inputs the search condition can be reduced, and further, time and effort for selecting the attribute item can be reduced. Further, if the item value is partially selected, the partially-selected character string, for example, "taro" will be input.

According to the fourth exemplary embodiment, the UI unit 302 functions as an attribute display unit, a selection unit, a search screen display unit, a determination unit, and a setting unit. The attribute display unit displays an attribute name and an attribute value thereof set for the document. The selection unit selects a desired attribute value from the displayed attribute values based on an instruction issued by the user. The search screen display unit displays the search screen. The determination unit determines, if an attribute name of a search conditional expression is designated in the search screen, whether the designated attribute name is an attribute name corresponding to the attribute value selected by the selection unit. The setting unit sets, if the designated attribute name is determined by the determination unit that it is the attribute name corresponding to the attribute value selected by the selection unit, a search conditional expression in which the designated attribute name and the selected attribute value are designated.

According to a fifth exemplary embodiment, further improvement is made to the first exemplary embodiment.

Regarding the search pane 501, once the search condition is set, the set condition is maintained until the clear button 511 is pressed. If the search pane is once changed to non-display and then is displayed again using the button 408 for changing display/non-display state in the property pane 404 or the button 409 for changing display/non-display of the search pane, or if the search is executed by pressing the search button 512, the set search condition will be maintained unless it is cleared.

Thus, if the first exemplary embodiment is applied to a case where an item corresponding to an item value which is in the selected state in the property pane is already set in one of the search conditional expressions which are effective in the search pane, two search conditional expressions having the same item will be generated. For example, if a search conditional expression includes "creator" as the item and "Namihei Nakano" as the item value, and further, if the first exemplary embodiment is applied to the search pane in this state, two search conditional expressions, one including "creator" and "Namihei Nakano" and the other including "creator" and "Momotaro Miyamoto" will be generated in the search pane.

If two search conditional expressions including the same item exist, one of the two search condition lines will be unnecessary if the item values are the same. Further, even if the item values are different, if the logical operator set in the logical operator pull-down list box 505 is "AND" and, further, if a matching condition corresponding to perfect match is selected in both conditional expressions, the search condition will be invalid.

This is because a document having a perfect match of "Namihei Nakano" being the "creator" and "Momotaro Miyamoto" also being the "creator" does not exist.

Further, if a matching condition corresponding to perfect match is selected in one conditional expression and a matching condition corresponding to partial match is selected in the other conditional expression, one of the two search condition lines will be unnecessary. Such a case is, for example, a conditional expression including the "creator" partially matching "taro" but also perfectly matching "Momotaro Miyamoto", or a conditional expression including the "creator" partially matching "Namihei" but also perfectly matching "Momotaro Miyamoto". In both cases, if "AND" operator is set in one search condition, the other search condition is clearly unnecessary.

A method for solving the above-described issue will be described. FIG. 14 is a flowchart illustrating the processing for displaying the search pane which is performed when an effective search conditional expression already exists in the search pane and a character string of an item value is in the selected state in the property pane. Processing in the flowchart in FIG. 14 is started after the processing in step S703 in FIG. 7.

In step S1401, the UI unit 302 driven by the CPU 201 of the client PC 102 determines whether an effective search condition line is in the search pane 501. As described above, the effective search condition line is a search condition line in which a value is set in each of the attribute item pull-down list box, the matching condition pull-down list box, and the item value text box.

If the UI unit 302 determines that an effective search condition line is in the search pane 501 (YES in step S1401), the processing proceeds to step S1402. In step S1402, the UI unit 302 determines whether a search condition line including an attribute item same as the attribute item corresponding to the item value, which is in the selected state in the property pane 404, is included in the effective search condition line.

If the UI unit 302 determines that a search condition line including the same attribute item is included in the search condition line (YES in step S1402), the processing proceeds to step S1403. In step S1403, the UI unit 302 determines whether the value set in the logical operator pull-down list box 505 is either "AND" or "OR".

If the UI unit 302 determines that "AND" is set in the logical operator pull-down list box 505 ("AND" in step S1403), the processing proceeds to step S1404. In step S1404, the UI unit 302 inputs the character string of the item value which is in the selected state in the property pane 404 in the item value text box of the search condition line having an attribute item same as the attribute item corresponding to the item value which is in the selected state in the property pane 404. In other words, the UI unit 302 overwrites the existing value of the item value text box with the character string which is in the selected state in the property pane.

If the UI unit 302 determines that "OR" is set in the logical operator pull-down list box 505 ("OR" in step S1403), the processing proceeds to step S1405. In step S1405, the UI unit 302 adds a designation line of the search conditional expression to the field 506. In step S1406, the UI unit 302 inputs the character string of the item value which is in the selected state in the property pane 404 in the item value text box of the designation line of the added search conditional expression.

In step S1407, the UI unit 302 selects and sets the attribute item, whose character string of the item value is in the selected state in the property pane 404, from the list items of the attribute item pull-down list box of the designation line of the added search conditional expression. In other words, the UI unit 302 adds a new search conditional expression in steps S1405 to S1407. Then, the UI unit 302 performs the processing corresponding to step S706 in FIG. 7.

According to the operation illustrated in FIG. 14, if an item same as the item that corresponds to the item value selected in the property pane is set in the existing search conditional expression in the search pane, the search condition will be changed or added while considering the setting of the logical operator of the search condition. Thus, according to the present exemplary embodiment, while maintaining the effect of the first exemplary embodiment, addition of unnecessary search condition and generation of meaningless search condition can be prevented.

In step S1403 in FIG. 14, if the value set in the logical operator pull-down list box 505 is "AND", the processing below can be added.

Processing for determining whether a matching condition that corresponds to partial match is set in the matching condition designation pull-down list box of the search condition line in which an attribute item same as the attribute item corresponding to the item value which is in the selected state in the property pane 404 is set. Processing for determining whether the character string of the item value which is in the selected state in the property pane 404 is partially selected. Processing for executing steps S1405 to S1407 and step S1203 in place of step S1404 if it is determined according to the above-described two determination processing procedures that a matching condition corresponding to partial match is set and, further, the character string of the item value is partially selected.

By adding the above-described processing, the search condition will be a condition in which a matching condition corresponding to partial match is selected for both the existing and the new conditional expressions when the logical operator is "AND", so that an effective search condition can be generated without overwriting the existing conditional expression.

Aspects of the present invention can also be realized by a computer of a system or apparatus (or devices such as a CPU or a micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-201996 filed Sep. 9, 2010, which is hereby incorporated by reference herein in its entirety.

What is claimed is:

1. A document management apparatus capable of managing a plurality of documents in which attribute names and attribute values corresponding to the attribute names are set as attributes, the document management apparatus comprising:

a memory that stores a computer program; and
at least one processor that executes the computer program to function as:
an attribute display unit configured to display, in an attribute display screen, attribute names and attribute values which have been set for one document selected from the plurality of documents based on a user's instruction, wherein the attribute display unit does not display, in the attribute display screen, attribute values which have not been set for the selected one document,
a selection unit configured to select, based on a user's instruction, at least one attribute value from the attribute values displayed in the attribute display screen by the attribute display unit,
a search screen display unit configured to display, when an instruction to display a search screen is issued in a state where the at least one attribute value is selected in the attribute display screen by the selection unit, the search screen in a state where the selected at least one attribute value and at least one attribute name corresponding to the selected at least one attribute value are set automatically as search conditional expression values and search conditional expression names in a search conditional expression of an attribute search in the search screen,
wherein an attribute value that is not selected by the selection unit is not set automatically as a search conditional expression of the attribute search in the search screen displayed by the search screen display unit,
wherein the search screen is different from the attribute display screen, and
wherein the search screen display unit displays, if a plurality of attribute values are selected by the selection unit, the search screen which includes a plurality of lines for which the selected plurality of attribute values and a plurality of attribute names corresponding to the selected plurality of attribute values are set automatically, wherein each of the plurality of lines is for setting a search conditional expression,
a setting unit configured to further add to and/or revise, based on a user's instruction, the search conditional expression of the attribute search in the search screen displayed by the search screen display unit, and
an execution unit configured to execute the attribute search for the plurality of documents based on the search conditional expression being set in the search screen.

2. The document management apparatus according to claim 1, wherein the at least one processing unit further functions as an adding unit configured to add a line used for setting a search conditional expression to the search screen if a plurality of attribute values are selected by the selection unit, and a number of the selected attribute values is greater than a number of the search conditional expressions displayed in the search screen.

3. A document management apparatus capable of managing a plurality of documents in which attribute names and attribute values corresponding to the attribute names are set as attributes, the document management apparatus comprising:
at least one processing unit that functions as:
an attribute display unit configured to display, in an attribute display screen, attribute names and attribute values which have been set for one document selected from the plurality of documents,
a selection unit configured to select, based on a user's instruction, at least one attribute value from the attribute values displayed in the attribute display screen by the attribute display unit,
a search screen display unit configured to display the search screen when an instruction to display a search screen is issued, and
a setting unit configured to set a search conditional expression of an attribute search in the search screen,
wherein, if the instruction to display the search screen is issued in a state where the at least one attribute value is selected in the attribute display screen by the selection unit, the search screen display unit displays the search screen in which the at least one attribute value selected by the selection unit is set for the search conditional expression by the setting unit,
wherein the search conditional expression is able to designate a matching condition in addition to an attribute name and an attribute value, and
wherein, if a character string of the attribute value is partially selected by the selection unit, the search screen display unit displays the search screen in which the attribute value selected by the selection unit, the attribute name corresponding to the attribute value, and the search conditional expression where partial match is designated as the matching condition are set, and
wherein, if a character string of the attribute value is fully selected by the selection unit, the search screen display unit displays the search screen in which the attribute value selected by the selection unit, the attribute name corresponding to the attribute value, and the search conditional expression where perfect match is designated as the matching condition are set.

4. The document management apparatus according to claim 1, wherein, as a search method, a full-text search is selectable in addition to the attribute search from the search screen, and
wherein, if the instruction to display the search screen is issued in a state where the at least one attribute value is selected by the selection unit, the search screen display unit displays the search screen having the attribute search selected as the search method.

5. The document management apparatus according to claim 1, wherein an AND operator or an OR operator is selectable as a logical operator that combines a plurality of search conditional expressions in the search screen,
wherein, if a search conditional expression, where at least one attribute name corresponding to the at least one attribute value selected by the selection unit is designated, is already set in the search screen and, if the AND operator is selected, the search screen display unit displays the search screen in which an attribute value designated in the search conditional expression is overwritten by the selected at least one attribute value, and
wherein, if a search conditional expression, where at least one attribute name corresponding to the at least one attribute value selected by the selection unit is designated, is set in the search screen and, if the OR operator is selected, the search screen display unit displays the search screen in which, separately from the search conditional expression, a search conditional expression where an attribute value selected by the selection unit and an attribute name corresponding to the attribute value are designated is set.

6. A method for designating a search in a document management apparatus capable of managing a plurality of documents in which attribute names and attribute values corresponding to the attribute names are set as attributes, the method comprising:
displaying, in an attribute display screen, attribute names and attribute values which have been set for one document selected from the plurality of documents based on a user's instruction, wherein displaying includes not displaying, in the attribute display screen, attribute values which have not been set for the selected one document;
selecting, based on a user's instruction, at least one attribute value from the attribute values displayed in the attribute display screen;
displaying, when an instruction to display a search screen is issued in a state where the at least one attribute value is selected in the attribute display screen, the search screen in a state where the selected at least one attribute value and at least one attribute name corresponding to the selected at least one attribute value are set automatically as search conditional expression values and search conditional expression names in a search conditional expression of an attribute search in the search screen,
wherein an attribute value that is not selected is not set automatically as a search conditional expression of the attribute search in the displayed search screen,
wherein the search screen is different from the attribute display screen, and
wherein, if a plurality of attribute values are selected, the displayed search screen includes a plurality of lines for which the selected plurality of attribute values and a plurality of attribute names corresponding to the selected plurality of attribute values are set automatically, wherein each of the plurality of lines is for setting a search conditional expression;

further adding to and/or revising, based on a user's instruction, the search conditional expression of the attribute search in the displayed search screen; and executing the attribute search for the plurality of documents based on the search conditional expression being set in the search screen.

7. A non-transitory storage medium storing a computer-executable program to cause a computer to perform a method for designating a search in a document management apparatus capable of managing a plurality of documents in which attribute names and attribute values corresponding to the attribute names are set as attributes, the method comprising:

displaying, in an attribute display screen, attribute names and attribute values which have been set for one document selected from the plurality of documents based on a user's instruction, wherein displaying includes not displaying, in the attribute display screen, attribute values which have not been set for the selected one document;

selecting, based on a user's instruction, at least one attribute value from the attribute values displayed in the attribute display screen;

displaying, when an instruction to display a search screen is issued in a state where the at least one attribute value is selected in the attribute display screen, the search screen in a state where the selected at least one attribute value and at least one attribute name corresponding to the selected at least one attribute value are set automatically as search conditional expression values and search conditional expression names in a search conditional expression of an attribute search in the search screen, wherein an attribute value that is not selected is not set automatically as a search conditional expression of the attribute search in the displayed search screen, wherein the search screen is different from the attribute display screen, and wherein, if a plurality of attribute values are selected, the displayed search screen includes a plurality of lines for which the selected plurality of attribute values and a plurality of attribute names corresponding to the selected plurality of attribute values are set automatically, wherein each of the plurality of lines is for setting a search conditional expression;

further adding to and/or revising, based on a user's instruction, the search conditional expression of the attribute search in the displayed search screen; and executing the attribute search for the plurality of documents based on the search conditional expression being set in the search screen.

8. The non-transitory storage medium according to claim 7, the method further comprising adding a line used for setting a search conditional expression to the search screen if a plurality of attribute values are selected, and a number of the selected attribute values is greater than a number of the search conditional expressions displayed in the search screen.

9. The non-transitory storage medium according to claim 7, wherein, as a search method, a full-text search is selectable in addition to the attribute search from the search screen, and wherein, if the instruction to display the search screen is issued in a state where the at least one attribute value is selected, displaying includes displaying the search screen having the attribute search selected as the search method.

10. The non-transitory storage medium according to claim 7, wherein an AND operator or an OR operator is selectable as a logical operator that combines a plurality of search conditional expressions in the search screen, wherein, if a search conditional expression, where at least one attribute name corresponding to the at least one attribute value selected is designated, is already set in the search screen and, if the AND operator is selected, displaying includes displaying the search screen in which an attribute value designated in the search conditional expression is overwritten by the selected at least one attribute value, and wherein, if a search conditional expression, where at least one attribute name corresponding to the selected at least one attribute value is designated, is set in the search screen and, if the OR operator is selected, displaying includes displaying the search screen in which, separately from the search conditional expression, a search conditional expression where an attribute value selected and an attribute name corresponding to the attribute value are designated is set.

11. A non-transitory storage medium storing a computer-executable program to cause a computer to perform a method for designating a search in a document management apparatus capable of managing a plurality of documents in which attribute names and attribute values corresponding to the attribute names are set as attributes, the method comprising:

displaying, in an attribute display screen, attribute names and attribute values which have been set for one document selected from the plurality of documents, selecting, based on a user's instruction, at least one attribute value from the attribute values displayed in the attribute display screen, displaying the search screen when an instruction to display a search screen is issued, and setting a search conditional expression of an attribute search in the search screen, wherein, if the instruction to display the search screen is issued in a state where the at least one attribute value is selected in the attribute display screen, displaying includes displaying the search screen in which the selected at least one attribute value is set for the search conditional expression, wherein the search conditional expression is able to designate a matching condition in addition to an attribute name and an attribute value, and wherein, if a character string of the attribute value is partially selected, displaying includes displaying the search screen in which the selected attribute value, the attribute name corresponding to the attribute value, and the search conditional expression where partial match is designated as the matching condition are set, and wherein, if a character string of the attribute value is fully selected, displaying includes displaying the search screen in which the selected attribute value, the attribute name corresponding to the attribute value, and the search conditional expression where perfect match is designated as the matching condition are set.

* * * * *